(12) United States Patent
Zhang et al.

(10) Patent No.: US 8,590,130 B2
(45) Date of Patent: Nov. 26, 2013

(54) CUTTING ELEMENTS WITH RE-PROCESSED THERMALLY STABLE POLYCRYSTALLINE DIAMOND CUTTING LAYERS, BITS INCORPORATING THE SAME, AND METHODS OF MAKING THE SAME

(75) Inventors: Youhe Zhang, Spring, TX (US); Yuelin Shen, Spring, TX (US); Madapusi K. Keshavan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 497 days.

(21) Appl. No.: 12/775,402

(22) Filed: May 6, 2010

(65) Prior Publication Data
US 2010/0282519 A1    Nov. 11, 2010

Related U.S. Application Data

(60) Provisional application No. 61/176,068, filed on May 6, 2009.

(51) Int. Cl.
*B23P 19/04*    (2006.01)
(52) U.S. Cl.
USPC ..................................................... 29/402.09
(58) Field of Classification Search
USPC ............... 29/402.03–402.09, 402.11, 402.13, 29/402.16, 402.18, 402.21, 525.13, 29/525.14; 175/434; 76/108.2
See application file for complete search history.

(56) References Cited

U.S. PATENT DOCUMENTS

| | | | |
|---|---|---|---|
| 2,941,241 A | 6/1960 | Strong |
| 2,941,248 A | 6/1960 | Hall |
| 2,947,611 A | 8/1960 | Bundy |
| 3,136,615 A | 6/1964 | Bovenkerk et al. |
| 3,141,746 A | 7/1964 | Lai |
| 3,233,988 A | 2/1966 | Wentorf, Jr. et al. |

(Continued)

FOREIGN PATENT DOCUMENTS

| | | |
|---|---|---|
| CN | 1200077 A | 11/1998 |
| EP | 0 196 777 B1 | 10/1986 |

(Continued)

OTHER PUBLICATIONS

International Search Report dated Jan. 11, 2011, for International Application No. PCT/US2010/033933, filed May 6, 2010.

(Continued)

*Primary Examiner* — John C Hong
(74) *Attorney, Agent, or Firm* — Christie, Parker & Hale, LLP

(57) ABSTRACT

A method of re-processing used TSP material layers to form cutting elements, bits with such cutting elements mounted on their bodies, and bits having re-processed TSP material layers attached to their bodies, as well as such cutting elements and bits are provided. The method includes providing a used TSP material cutting element having a TSP material layer and substrate, or a bit having a TSP material layer attached to the bit, removing the used TSP material layer from the cutting element or bit, cutting the used TSP material layer to a new shape, if necessary, optionally re-leaching the used TSP layer and re-using the TSP material layer to form a cutting element, or in forming a bit body. The formed cutting element may be mounted on a bit body.

32 Claims, 10 Drawing Sheets

(56) References Cited

U.S. PATENT DOCUMENTS

| | | | |
|---|---|---|---|
| 3,609,818 | A | 10/1971 | Wentorf, Jr. |
| 3,745,623 | A | 7/1973 | Wentorf, Jr. et al. |
| 3,767,371 | A | 10/1973 | Wentorf, Jr. et al. |
| 4,104,344 | A | 8/1978 | Pope et al. |
| 4,108,614 | A | 8/1978 | Mitchell |
| 4,151,686 | A | 5/1979 | Lee et al. |
| 4,224,380 | A | 9/1980 | Bovenkerk et al. |
| 4,255,165 | A | 3/1981 | Dennis et al. |
| 4,268,276 | A | 5/1981 | Bovenkerk |
| 4,288,248 | A | 9/1981 | Bovenkerk et al. |
| 4,289,503 | A | 9/1981 | Corrigan |
| 4,303,442 | A | 12/1981 | Hara et al. |
| 4,311,490 | A | 1/1982 | Bovenkerk et al. |
| 4,343,371 | A | 8/1982 | Baker, III et al. |
| 4,373,593 | A | 2/1983 | Phaal et al. |
| 4,387,287 | A | 6/1983 | Marazzi |
| 4,403,015 | A | 9/1983 | Nakai et al. |
| 4,412,980 | A | 11/1983 | Tsuji et al. |
| 4,481,016 | A | 11/1984 | Campbell et al. |
| 4,486,286 | A | 12/1984 | Lewin et al. |
| 4,504,519 | A | 3/1985 | Zelez |
| 4,505,746 | A | 3/1985 | Nakai et al. |
| 4,522,633 | A | 6/1985 | Dyer |
| 4,525,178 | A | 6/1985 | Hall |
| 4,525,179 | A | 6/1985 | Gigl |
| 4,534,773 | A | 8/1985 | Phaal et al. |
| 4,556,403 | A | 12/1985 | Almond et al. |
| 4,560,014 | A | 12/1985 | Geczy |
| 4,570,726 | A | 2/1986 | Hall |
| 4,572,722 | A | 2/1986 | Dyer |
| 4,604,106 | A | 8/1986 | Hall et al. |
| 4,605,343 | A | 8/1986 | Hibbs, Jr. et al. |
| 4,606,738 | A | 8/1986 | Hayden |
| 4,621,031 | A | 11/1986 | Scruggs |
| 4,629,373 | A | 12/1986 | Hall |
| 4,636,253 | A | 1/1987 | Nakai et al. |
| 4,645,977 | A | 2/1987 | Kurokawa et al. |
| 4,662,348 | A | 5/1987 | Hall et al. |
| 4,664,705 | A | 5/1987 | Horton et al. |
| 4,670,025 | A | 6/1987 | Pipkin |
| 4,673,414 | A | 6/1987 | Lavens et al. |
| 4,694,918 | A | 9/1987 | Hall |
| 4,707,384 | A | 11/1987 | Schachner et al. |
| 4,726,718 | A | 2/1988 | Meskin et al. |
| 4,766,040 | A | 8/1988 | Hillert et al. |
| 4,776,861 | A | 10/1988 | Frushour |
| 4,784,023 | A | 11/1988 | Dennis |
| 4,792,001 | A | 12/1988 | Zijsling |
| 4,793,828 | A | 12/1988 | Burnand |
| 4,797,241 | A | 1/1989 | Peterson et al. |
| 4,802,539 | A | 2/1989 | Hall et al. |
| 4,807,402 | A | 2/1989 | Rai |
| 4,828,582 | A | 5/1989 | Frushour |
| 4,844,185 | A | 7/1989 | Newton, Jr. et al. |
| 4,850,523 | A | 7/1989 | Slutz |
| 4,861,350 | A | 8/1989 | Phaal et al. |
| 4,871,377 | A | 10/1989 | Frushour |
| 4,882,128 | A | 11/1989 | Hukvari et al. |
| 4,899,922 | A | 2/1990 | Slutz et al. |
| 4,919,220 | A | 4/1990 | Fuller et al. |
| 4,931,068 | A | 6/1990 | Dismukes et al. |
| 4,933,529 | A | 6/1990 | Saville |
| 4,940,180 | A | 7/1990 | Martell |
| 4,943,488 | A | 7/1990 | Sung et al. |
| 4,944,772 | A | 7/1990 | Cho |
| 4,976,324 | A | 12/1990 | Tibbitts |
| 4,984,642 | A | 1/1991 | Renard et al. |
| 4,987,800 | A | 1/1991 | Gasan et al. |
| 5,011,514 | A | 4/1991 | Cho et al. |
| 5,011,515 | A | 4/1991 | Frushour |
| 5,027,912 | A | 7/1991 | Juergens |
| 5,030,276 | A | 7/1991 | Sung et al. |
| 5,032,147 | A | 7/1991 | Frushour |
| 5,068,148 | A | 11/1991 | Nakahara et al. |
| 5,092,687 | A | 3/1992 | Hall |
| 5,096,465 | A | 3/1992 | Chen et al. |
| 5,116,568 | A | 5/1992 | Sung et al. |
| 5,127,923 | A | 7/1992 | Bunting et al. |
| 5,135,061 | A | 8/1992 | Newton, Jr. |
| 5,176,720 | A | 1/1993 | Martell et al. |
| 5,186,725 | A | 2/1993 | Martell et al. |
| 5,199,832 | A | 4/1993 | Meskin et al. |
| 5,205,684 | A | 4/1993 | Meskin et al. |
| 5,213,248 | A | 5/1993 | Horton et al. |
| 5,238,074 | A | 8/1993 | Tibbitts et al. |
| 5,264,283 | A | 11/1993 | Waldenström et al. |
| 5,337,844 | A | 8/1994 | Tibbitts |
| 5,355,696 | A | 10/1994 | Briggs |
| 5,369,034 | A | 11/1994 | Hargett et al. |
| 5,370,195 | A | 12/1994 | Keshavan et al. |
| 5,379,853 | A | 1/1995 | Lockwood et al. |
| 5,439,492 | A | 8/1995 | Anthony et al. |
| 5,464,068 | A | 11/1995 | Najafi-Sani |
| 5,468,268 | A | 11/1995 | Tank et al. |
| 5,496,638 | A | 3/1996 | Waldenström et al. |
| 5,505,748 | A | 4/1996 | Tank et al. |
| 5,510,193 | A | 4/1996 | Cerutti et al. |
| 5,523,121 | A | 6/1996 | Anthony et al. |
| 5,524,719 | A | 6/1996 | Dennis |
| 5,560,716 | A | 10/1996 | Tank et al. |
| 5,564,511 | A | 10/1996 | Frushour |
| 5,605,198 | A | 2/1997 | Tibbitts et al. |
| 5,607,024 | A | 3/1997 | Keith et al. |
| 5,620,382 | A | 4/1997 | Cho et al. |
| 5,624,068 | A | 4/1997 | Waldenström et al. |
| 5,645,617 | A | 7/1997 | Frushour |
| 5,667,028 | A | 9/1997 | Truax et al. |
| 5,718,948 | A | 2/1998 | Ederyd et al. |
| 5,722,497 | A | 3/1998 | Gum et al. |
| 5,722,499 | A | 3/1998 | Nguyen et al. |
| 5,776,615 | A | 7/1998 | Wong et al. |
| 5,820,985 | A | 10/1998 | Chow et al. |
| 5,833,021 | A | 11/1998 | Mensa-Wilmot et al. |
| 5,853,873 | A | 12/1998 | Kukino et al. |
| 5,875,862 | A | 3/1999 | Jurewicz et al. |
| 5,887,580 | A | 3/1999 | Eyre |
| 5,889,219 | A | 3/1999 | Moriguchi et al. |
| 5,897,942 | A | 4/1999 | Karner et al. |
| 5,954,147 | A | 9/1999 | Overstreet et al. |
| 5,979,575 | A | 11/1999 | Overstreet et al. |
| 5,979,578 | A | 11/1999 | Packer |
| 6,009,962 | A | 1/2000 | Beaton |
| 6,009,963 | A | 1/2000 | Chaves et al. |
| 6,041,875 | A | 3/2000 | Rai et al. |
| 6,054,693 | A | 4/2000 | Barmatz et al. |
| 6,063,333 | A | 5/2000 | Dennis |
| 6,123,612 | A | 9/2000 | Goers |
| 6,126,741 | A | 10/2000 | Jones et al. |
| 6,132,675 | A | 10/2000 | Corrigan et al. |
| 6,165,616 | A | 12/2000 | Lemelson et al. |
| 6,193,001 | B1 | 2/2001 | Eyre et al. |
| 6,196,341 | B1 | 3/2001 | Chaves |
| 6,202,770 | B1 | 3/2001 | Jurewicz et al. |
| 6,206,115 | B1 | 3/2001 | Overstreet et al. |
| 6,216,805 | B1 | 4/2001 | Lays et al. |
| 6,220,375 | B1 | 4/2001 | Butcher et al. |
| 6,234,261 | B1 | 5/2001 | Evans et al. |
| 6,248,447 | B1 | 6/2001 | Griffin et al. |
| 6,258,139 | B1 | 7/2001 | Jensen |
| 6,269,894 | B1 | 8/2001 | Griffin |
| 6,298,930 | B1 | 10/2001 | Sinor et al. |
| 6,302,225 | B1 | 10/2001 | Yoshida et al. |
| 6,315,065 | B1 | 11/2001 | Yong et al. |
| 6,344,149 | B1 | 2/2002 | Oles |
| 6,410,085 | B1 | 6/2002 | Griffin et al. |
| 6,435,058 | B1 | 8/2002 | Matthias et al. |
| 6,443,248 | B2 | 9/2002 | Yong et al. |
| 6,447,560 | B2 | 9/2002 | Jensen et al. |
| 6,544,308 | B2 | 4/2003 | Griffin et al. |
| 6,550,556 | B2 | 4/2003 | Middlemiss et al. |
| 6,562,462 | B2 | 5/2003 | Griffin et al. |
| 6,585,064 | B2 | 7/2003 | Griffin et al. |
| 6,589,640 | B2 | 7/2003 | Griffin et al. |
| 6,592,985 | B2 | 7/2003 | Griffin et al. |

(56) References Cited

U.S. PATENT DOCUMENTS

| | | |
|---|---|---|
| 6,601,662 B2 | 8/2003 | Matthias et al. |
| 6,605,798 B1 | 8/2003 | Cullen |
| 6,725,953 B2 | 4/2004 | Truax et al. |
| 6,739,214 B2 | 5/2004 | Griffin et al. |
| 6,749,033 B2 | 6/2004 | Griffin et al. |
| 6,797,326 B2 | 9/2004 | Griffin et al. |
| 6,892,836 B1 | 5/2005 | Eyre et al. |
| 7,108,598 B1 | 9/2006 | Galloway |
| 7,234,550 B2 | 6/2007 | Azar et al. |
| 7,316,279 B2 | 1/2008 | Wiseman et al. |
| 7,350,601 B2 | 4/2008 | Belnap et al. |
| 7,377,341 B2 | 5/2008 | Middlemiss et al. |
| 7,469,757 B2 | 12/2008 | Azar et al. |
| 7,568,770 B2 | 8/2009 | Hall et al. |
| 2002/0071729 A1 | 6/2002 | Middlemiss et al. |
| 2002/0084112 A1 | 7/2002 | Hall et al. |
| 2003/0235691 A1 | 12/2003 | Griffin et al. |
| 2004/0245024 A1 | 12/2004 | Kembaiyan |
| 2005/0050801 A1 | 3/2005 | Cho et al. |
| 2005/0129950 A1 | 6/2005 | Griffin et al. |
| 2005/0133277 A1 | 6/2005 | Dixon |
| 2005/0210755 A1 | 9/2005 | Cho et al. |
| 2005/0230156 A1 | 10/2005 | Belnap et al. |
| 2005/0263328 A1 | 12/2005 | Middlemiss |
| 2006/0032677 A1 | 2/2006 | Azar et al. |
| 2006/0060390 A1 | 3/2006 | Eyre |
| 2006/0060392 A1 | 3/2006 | Eyre |
| 2006/0157285 A1 | 7/2006 | Cannon et al. |
| 2006/0165993 A1 | 7/2006 | Keshavan |
| 2006/0191723 A1 | 8/2006 | Keshavan |
| 2006/0207802 A1 | 9/2006 | Zhang et al. |
| 2006/0219439 A1 | 10/2006 | Shen et al. |
| 2006/0247769 A1 | 11/2006 | Molz et al. |
| 2006/0266558 A1 | 11/2006 | Middlemiss et al. |
| 2006/0266559 A1 | 11/2006 | Keshavan et al. |
| 2007/0029114 A1 | 2/2007 | Middlemiss |
| 2007/0079994 A1 | 4/2007 | Middlemiss |
| 2007/0169419 A1 | 7/2007 | Davis et al. |
| 2007/0181348 A1 | 8/2007 | Lancaster et al. |
| 2008/0006448 A1 | 1/2008 | Zhang et al. |
| 2008/0085407 A1 | 4/2008 | Cooley et al. |
| 2008/0115421 A1 | 5/2008 | Sani |
| 2008/0142276 A1 | 6/2008 | Griffo et al. |
| 2008/0149398 A1 | 6/2008 | Azar |
| 2008/0178535 A1 | 7/2008 | Wan |
| 2008/0185189 A1 | 8/2008 | Griffo et al. |
| 2008/0206576 A1 | 8/2008 | Qian et al. |
| 2008/0223621 A1 | 9/2008 | Middlemiss et al. |
| 2008/0223623 A1 | 9/2008 | Keshavan et al. |
| 2008/0230280 A1 | 9/2008 | Keshavan et al. |
| 2008/0302575 A1 | 12/2008 | Durairajan et al. |
| 2008/0302579 A1 | 12/2008 | Keshavan et al. |
| 2009/0032169 A1 | 2/2009 | Dourfaye et al. |
| 2009/0152018 A1 | 6/2009 | Sani |
| 2010/0084197 A1 | 4/2010 | Voronin et al. |
| 2013/0015000 A1* | 1/2013 | Zhang et al. |

FOREIGN PATENT DOCUMENTS

| | | |
|---|---|---|
| EP | 0 300 699 A2 | 1/1989 |
| EP | 0 329 954 A2 | 8/1989 |
| EP | 0 352 811 A1 | 1/1990 |
| EP | 0 500 253 A1 | 8/1992 |
| EP | 0 595 630 A1 | 5/1994 |
| EP | 0 612 868 A1 | 8/1994 |
| EP | 0 617 207 A2 | 9/1994 |
| EP | 0 787 820 A2 | 8/1997 |
| EP | 0 860 515 A1 | 8/1998 |
| EP | 1 116 858 A1 | 7/2001 |
| EP | 1 190 791 A2 | 3/2002 |
| EP | 1 958 688 A1 | 8/2008 |
| GB | 1 349 385 A | 4/1974 |
| GB | 2 048 927 A | 12/1980 |
| GB | 2 261 894 A | 6/1993 |
| GB | 2 268 768 A | 1/1994 |
| GB | 2 270 492 A | 3/1994 |
| GB | 2 270 493 A | 3/1994 |
| GB | 2 323 398 A | 9/1998 |
| GB | 2 351 747 A | 1/2001 |
| GB | 2 367 081 A | 3/2002 |
| GB | 2 408 735 A | 6/2005 |
| GB | 2 413 575 A | 11/2005 |
| GB | 2 418 215 A | 3/2006 |
| GB | 2 422 623 A | 8/2006 |
| GB | 2 427 215 A | 12/2006 |
| GB | 2 429 471 A | 2/2007 |
| GB | 2 429 727 A | 3/2007 |
| GB | 2 438 073 A | 11/2007 |
| GB | 2 447 776 A | 9/2008 |
| JP | 59-219500 | 12/1984 |
| JP | 60-187603 | 9/1985 |
| WO | WO 93/23204 | 11/1993 |
| WO | WO 96/34131 | 10/1996 |
| WO | WO 97/09174 A1 | 3/1997 |
| WO | WO 00/28106 | 5/2000 |
| WO | WO 2004/040095 A1 | 5/2004 |
| WO | WO 2004/106003 A1 | 12/2004 |
| WO | WO 2004/106004 A1 | 12/2004 |
| WO | WO 2007/042920 A1 | 4/2007 |

OTHER PUBLICATIONS

State Intellectual Property Office of P.R. China; Notice of the First Office Action (with English Translation); for Application No. 201080018666.X; dated Jun. 4, 2013; 10 pages.

* cited by examiner

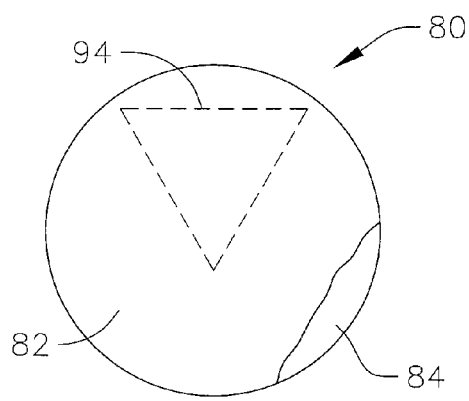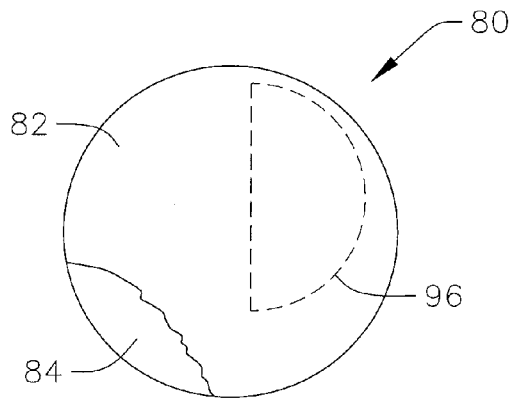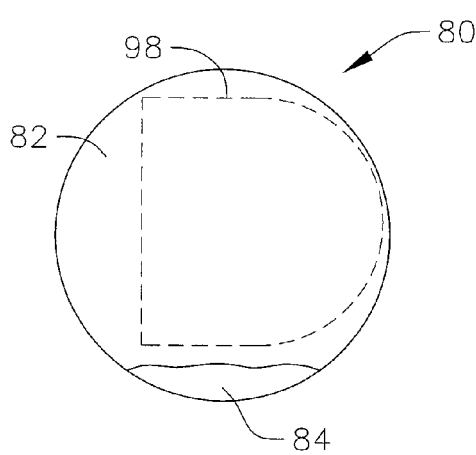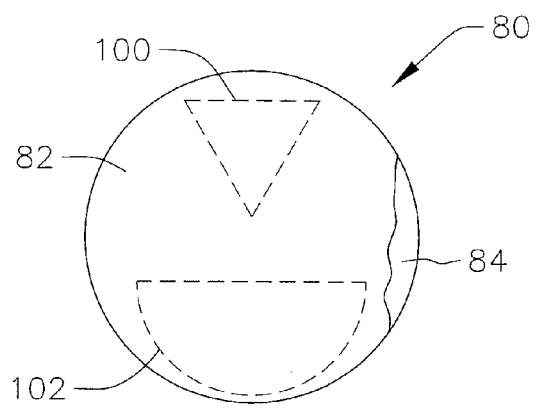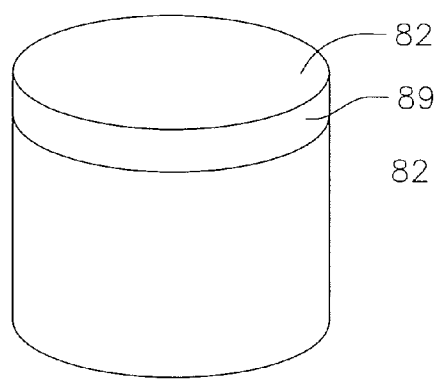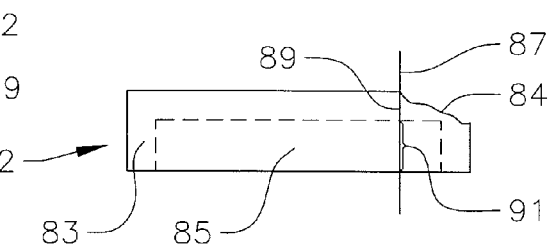

CUTTING ELEMENTS WITH RE-PROCESSED THERMALLY STABLE POLYCRYSTALLINE DIAMOND CUTTING LAYERS, BITS INCORPORATING THE SAME, AND METHODS OF MAKING THE SAME

CROSS-REFERENCE TO RELATED APPLICATIONS

This application claims the priority to and the benefit of U.S. Provisional Application No. 61/176,068, filed May 6, 2009, the disclosure of which is incorporated herein by reference.

BACKGROUND OF THE INVENTION

This invention is directed to a method of re-processing thermally stable polycrystalline diamond ("TSP") materials to form new cutting elements and bits incorporating such cutting elements, as well as to such cutting elements and bits.

A TSP material is typically formed by "leaching" at least a substantial portion of a catalyst from polycrystalline diamond ("PCD") using a leaching agent. When formed, polycrystalline diamond comprises individual diamond crystals that are interconnected defining a diamond network. A catalyst, which is used to facilitate the bonding of diamond crystals to form the PCD is often found within the interstitial spaces in the diamond network. Catalyst used in the formation of PCD include metals from the Group VIII of the Periodic Table, with cobalt being the most common. Cobalt has a significantly different coefficient of thermal expansion as compared to diamond, and as such, upon frictional heating of the polycrystalline diamond during use, the catalyst expands, causing cracking to form in the network structure, resulting in the deterioration of the polycrystalline diamond layer. Polycrystalline diamond having a second phase metal catalyst will generally not have thermal stability at temperatures above 700° C. By removing, i.e., by leaching, the catalyst (e.g., the cobalt) from the diamond network structure, the polycrystalline diamond layer becomes more heat resistant, as well as less prone to cracking when heated. Typically, strong acids are used to "leach" the catalyst from the diamond network structure.

Generally, to form a PCD layer, a substrate of cemented tungsten carbide (a substrate where tungsten carbide particles are cemented together with a binder such as cobalt) is placed adjacent to a layer of diamond particles, which may also be premixed with a catalyst, such as cobalt, in a refractory metal enclosure typically referred to as a "can", as for example a niobium can, and the combination is subjected to a high temperature at a high pressure where diamond is thermodynamically stable. This process is referred to as a high-temperature-high-pressure sintering process (an "HTHP sintering process"). This process results in the recrystallization and formation of a polycrystalline diamond ultra hard material layer bonded on the tungsten carbide substrate. During the HTHP sintering process the catalyst helps form the bonds between the diamond particles forming the PCD. The PCD layer is then removed from the substrate by cutting off and by lapping off the substrate, as necessary. The removed PCD layer is then leached to substantially remove all of the catalyst to form the TSP material. Typically at least 95%, and in many cases over 99% of the catalyst is removed such that essentially a matrix of diamond bonded crystals, with no catalyst or mere traces of the catalyst, remain. In this regard the spaces occupied by the removed catalyst remain void. The TSP material layer may then be attached to another substrate by brazing, or by a high-temperature-high-pressure process (an "HTHP bonding process") where a cemented tungsten carbide substrate is provided adjacent the TSP layer and is heated at a sufficient temperature and at a sufficient pressure to melt and get a binder, such as the cobalt in the tungsten carbide, to infiltrate the void spaces in the TSP material layer for attaching the TSP material to the substrate forming a TSP material cutting element, such as a TSP material cutter or compact. Moreover, an infiltrant such as a metal or metal alloy infiltrant, as for example copper, silver, copper alloys and silver alloys, which have a melting temperature that is lower than the melting temperature of the diamond particles, may also be used to infiltrate the TSP material when being attached to the substrate. Infiltrants bond the TSP material to the substrate by infiltrating the TSP material voids and are non-catalyzing. It should be noted that an HTHP bonding process is not a sintering process as is the HTHP sintering process referred in the formation on the PCD. Moreover, the times; temperatures and/or pressures in an HTHP bonding process may be different than those in an HTHP sintering process. For convenience the term "HTHP process" is used herein to refer to a process requiring high temperature and high pressure as for example an HTHP sintering process or on HTHP bonding process.

Currently, TSP material cutting elements and compacts are disregarded when a portion of their TSP layers wears by a pre-determined amount and/or the substrate on which they are attached on wears or erodes by a pre-determined amount. As TSP material layers are relatively expensive to manufacture, a way of re-processing and re-using such TSP material layers is desired.

SUMMARY OF THE INVENTION

In an exemplary embodiment a method of making a cutting element is provided. The method includes removing a TSP material cutting element from a bit. The TSP material cutting element includes a TSP material layer bonded to a substrate, where the TSP material layer is a polycrystalline diamond layer and where at least a substantial portion of a catalyst in at least a portion of such layer has been removed. The method further includes separating the TSP material layer from the substrate, and attaching the TSP material layer onto a new substrate forming a new cutting element. In another exemplary embodiment, the method further includes leaching the TSP material layer to remove substantially all of a catalyst and/or an infiltrant from the TSP material layer prior to attaching. In another exemplary embodiment, at least substantially all of the catalyst has been removed from the entire TSP material layer prior to attaching. In yet another exemplary embodiment, the separated TSP material layer includes an infiltrant, and the method further includes leaching the TSP material layer to remove at least part of the infiltrant. In one exemplary embodiment, the infiltrant is a metal or metal alloy infiltrant. In another exemplary embodiment, attaching includes subjecting the TSP material layer portion and the new substrate to a HTHP bonding process using an infiltrant. In yet a further exemplary embodiment, the infiltrant infiltrates only a portion of the TSP material layer during attaching. In yet another exemplary embodiment, the method also includes removing at least a portion of the infiltrant from the attached TSP material layer. In another exemplary embodiment, the method further includes cutting the TSP material layer leaving a cut TSP material layer portion, and attaching includes attaching the cut TSP material layer portion. In yet a further exemplary embodiment, the method further includes leaching the TSP material layer or the cut TSP material layer portion to remove at least a portion of a catalyst and/or infiltrant in the TSP material layer or the cut TSP material layer portion. In one exemplary embodiment, the new substrate is placed adjacent a side of the TSP material layer, and another substrate is placed adjacent an opposite side of the TSP material layer, whereby the TSP material layer is sandwiched between the new substrate and the another substrate, and the TSP material layer and both substrates are subjected to a HTHP bonding process. In another exemplary embodiment, the another substrate is a green powder including tungsten carbide. In yet another exemplary embodiment, the new substrate and the powder together completely encapsulate the TSP material layer. In a further exemplary embodiment, attaching is selected from the attaching methods consisting essentially of brazing and microwave sintering. In one exemplary embodiment, the method further includes infiltrating at least a portion of the TSP material layer with an infiltrant having a coefficient of thermal expansion similar to the coefficient of thermal expansion of diamond.

In another exemplary embodiment, a method of making a cutting element is provided. The method includes HTHP sintering a diamond material onto a first substrate forming a polycrystalline diamond ultra hard material layer, including a catalyst, bonded onto the first substrate, separating the polycrystalline diamond ultra hard material layer from the first substrate, removing at least a substantial portion of the catalyst from at least a portion of the polycrystalline ultra hard material layer forming a TSP material layer, attaching the TSP material layer onto a second substrate using a HTHP bonding process forming another cutting element. The method further includes mounting the cutting element to a bit body, using the bit body with the cutting element to cut earth formations, removing the cutting element from the bit body, separating the TSP material layer from the second substrate, and attaching the TSP material layer separated from the second substrate to a third substrate to form a new cutting element. In one exemplary embodiment, removing at least a substantial portion of the catalyst occurs prior to separating the polycrystalline diamond layer from the first substrate. In another exemplary embodiment, the method further includes removing at least a portion of an infiltrant from the TSP material layer prior to, or after, attaching the TSP material layer separated from the second substrate to the third substrate. In yet a further exemplary embodiment, the method further includes determining whether an infiltrant has infiltrated the TSP material layer during attaching of the TSP material layer to the second substrate, and removing at least a portion of the infiltrant from the TSP material layer prior to, or after, attaching the TSP material layer separated from the second substrate to the third substrate. In one exemplary embodiment, the infiltrant is a metal or metal alloy infiltrant. In another exemplary embodiment, the method further includes cutting the TSP material layer leaving a cut TSP material layer portion, and attaching the TSP material layer separated from the second substrate to a third substrate includes attaching the cut TSP material layer portion to the third substrate. In yet a further exemplary embodiment, an infiltrant infiltrates only a portion of the TSP material layer. In another exemplary embodiment, attaching the TSP material layer separated from the second substrate to a third substrate includes subjecting the TSP material layer portion, and the third substrate to a HTHP bonding process using an infiltrant, such that the infiltrant infiltrates at least a portion of the TSP material layer. In yet another exemplary embodiment, the method further includes removing at least a portion of the infiltrant. In one exemplary embodiment, the third substrate is placed adjacent a side of the TSP material layer, and another substrate is placed adjacent an opposite side of the TSP material layer, whereby the TSP material layer is sandwiched between the third substrate and the another substrate, and the TSP material layer and both substrates are subjected to a HTHP bonding process. In another exemplary embodiment, the another substrate is a green powder including tungsten carbide. In yet another exemplary embodiment, the new substrate and the powder together completely encapsulate the TSP material layer. In one exemplary embodiment, the method further includes infiltrating at least a portion of the TSP material layer with an infiltrant having a coefficient of thermal expansion similar to the coefficient of thermal expansion of diamond, and the infiltrating occurs after using the bit body.

In one exemplary embodiment, a method of forming a bit body is provided including receiving a used TSP material layer which is attached to a substrate, which TSP material layer has been used to cut an object and where the TSP material layer is a polycrystalline diamond layer with at least a substantial portion of a catalyst and/or infiltrant of at least a portion of such layer has been removed. The method also requires removing the TSP material layer from the substrate, cutting the TSP material layer into a plurality of TSP material layer pieces, providing a mold, providing a matrix powder, mixing the matrix powder with at least one of the TSP material layer pieces, placing the mixed powder with the at least one of the TSP material layer pieces in the mold, providing a binder material within the mold, and heating the mold to infiltrate the mixed powder to form a bit body including a portion including the at least one of the TSP material layer pieces. In another exemplary embodiment, the method further includes removing the used cutting element from a bit body. In yet another exemplary embodiment, the method further includes leaching the TSP material layer to remove at least another portion of the catalyst or a portion of an infiltrant. In yet a further exemplary embodiment, at least a substantial portion of the catalyst has been removed from the TSP material layer pieces. The method in one exemplary embodiment requires removing a worn portion of the TSP material layer. The used TSP material layer may be part of a used cutting element and may be attached to a substrate or may be attached to a used bit body. In such case, the used TSP material layer is removed from the substrate or bit body.

In a further exemplary embodiment, a method for forming a cutting element is provided including receiving a used TSP material layer, the TSP material layer having been used to cut an object, the TSP material layer being a polycrystalline diamond layer with at least a substantial portion of a catalyst in at least a portion of the layer having been removed. The claim also requires attaching the TSP material layer on a substrate, and infiltrating the TSP material layer with an infiltrant. In yet a further exemplary embodiment, the method further includes removing at least a substantial portion of the infiltrant from at least a portion of the TSP material layer. In one exemplary embodiment, the infiltrating occurs during attaching. In yet another exemplary embodiment, the infiltrant is a material having a coefficient of thermal expansion similar to the coefficient of thermal expansion of diamond. In one exemplary embodiment, the method further includes cutting the TSP material layer prior to attaching.

In another exemplary embodiment, a cutting element is provided. The cutting element includes a substrate, and a TSP material cutting layer attached to the substrate, where the TSP cutting layer has been subjected to at least two HTHP processes prior to being attached to the substrate, and where the TSP material layer is a polycrystalline diamond layer with at least a substantial portion of a catalyst in at least a portion of such layer having been removed. In an exemplary embodiment, the at least a substantial portion of the catalyst has been removed from the entire polycrystalline diamond layer to form the TSP material layer. In one exemplary embodiment, the TSP material cutting layer has been subjected to at least three HTHP processes prior to being attached. In yet another exemplary embodiment, the TSP material cutting layer includes a first region at least substantially free of an infiltrant and a second region including an infiltrant. In yet a further exemplary embodiment, the infiltrant is the second region includes a material having a coefficient of thermal expansion close to the coefficient of thermal expansion of diamond. In yet another exemplary embodiment, a bit is provided including a body and any of the aforementioned cutting elements mounted on its body.

In a further exemplary embodiment, a bit body is provided including pieces of TSP material embedded in the body, the TSP material having been subjected to at least two HTHP processes prior to being embedded, and where the TSP material is a polycrystalline diamond material with at least a substantial portion of a catalyst in at least a portion of such material having been removed.

In another exemplary embodiment, a method of forming a cutting element is provided. The method includes receiving a used cutting element including a substrate and a TSP material layer attached to the substrate, wherein the TSP material layer is a polycrystalline diamond layer with at least a substantial portion of a catalyst in at least a portion of such polycrystalline diamond layer having been removed, wherein a portion of at least one of the TSP material layer and the substrate is worn. The method further includes removing a section of the TSP material layer and a corresponding section of the substrate including the worn portion to form a new cutting element having at least one of a new dimension and a new shape. In a further exemplary embodiment, removing includes at least one of grinding, cutting and lapping of the TSP material layer and substrate. In one exemplary embodiment, the method includes leaching the TSP material layer prior to, or after the removing, for removing substantially all of at least one of a catalyst and an infiltrant from at least a portion of the TSP material layer. In another exemplary embodiment, the method also includes attaching the new cutting element to a bit body. In one exemplary embodiment, removing a section of the TSP material layer exposes a new surface of the TSP material layer and the method further includes removing at least one of a catalyst or an infiltrant for at least a portion of the new surface.

In another exemplary embodiment, a method of forming a cutting element is provided. The method includes receiving a used TSP material layer which been used to cut an object, wherein the TSP material layer is a polycrystalline diamond layer with at least a substantial portion of a catalyst in at least a portion of such polycrystalline diamond layer having been removed. The method further includes attaching the used TSP material layer onto a substrate. In yet another exemplary embodiment, the method also includes leaching the used TSP material layer to remove substantially all of the catalyst from the TSP material layer prior to attaching. In one exemplary embodiment, the attached used TSP material layer includes an infiltrant, and the method further includes leaching the used TSP material layer to remove at least part of the infiltrant. In an exemplary embodiment, the infiltrant is an infiltrant selected from the group of infiltrants consisting essentially of metal infiltrants, and metal alloy infiltrants. In another exemplary embodiment, bonding includes subjecting the used TSP material layer portion and the substrate to a HTHP bonding process using an infiltrant. The method may also include cutting the used TSP material layer leaving a cut used TSP material layer portion, and attaching includes attaching the cut used TSP material layer portion. In one exemplary embodiment, the substrate is placed adjacent a side of the used TSP material layer, and another substrate is placed adjacent an opposite side of the used TSP material layer, whereby the used TSP material layer is sandwiched between the substrate and the another substrate, and the used TSP material layer and both substrates are subjected to a HTHP bonding process. In a further exemplary embodiment, the another substrate is a green powder including tungsten carbide. In one embodiment, the substrate and the powder together completely encapsulate the used TSP material layer. In yet a further exemplary embodiment, the method also includes infiltrating at least a portion of the used TSP material layer with an infiltrant having a coefficient of thermal expansion similar to the coefficient of thermal expansion of diamond. In yet another exemplary embodiment, receiving includes receiving a cutting element including a substrate bonded to the used TSP material layer, and the method further includes removing the substrate from the used TSP material layer. In yet a further exemplary embodiment, receiving includes receiving a bit body having the used TSP material layer attached to the bit body, and the method further includes separating the used TSP material layer from the bit body.

BRIEF DESCRIPTION OF THE DRAWINGS

FIGS. 13A, 13B, 13C, 13D, 13E, 13F, 13G and 13H are top views of TSP material cutters depicting potential new shapes in accordance with exemplary embodiments of the present invention.

FIG. 13I is a perspective view of a new cutter having the potential new shape depicted in FIG. 13B.

FIG. 13J is cross-sectional view of a TSP material layer that has been leached partially through its thickness having a worn portion.

DETAILED DESCRIPTION OF THE INVENTION

The present invention takes cutters, compacts, inserts, or bits which include TSP material layers, such as TSP material cutting layers, which have been used in the field and re-processes their TSP material layers to form new TSP material cutting elements such as shear cutters, compacts, or inserts for mounting on a bit or cutting elements which are embedded in bit body surfaces, which cutting elements are used for cutting earth formations. It should be noted that a "cutting element" as used herein refers to any type of cutting structure including an ultra hard material layer such as a TSP material layer and may or may not include a substrate. For example, as TSP material layer by itself is a "cutting element" as is a shear cutter having a TSP material cutting layer attached to a substrate.

Figure 1:
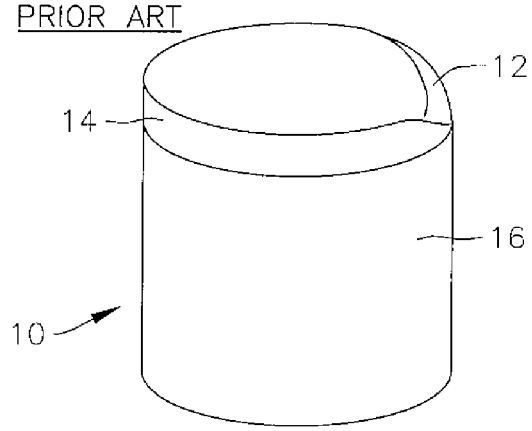
FIG. 1 is a perspective view of a used TSP material cutter having a TSP material cutting layer.
Figure 2:
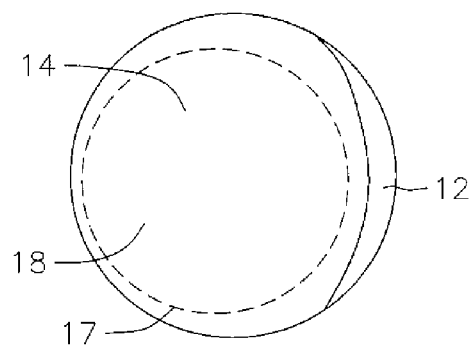
FIGS. 2 and 3 are top views of the TSP material cutting layer of the cutter shown in FIG. 1 depicting possible cutting options in dashed lines.

Typically, when TSP cutters, compacts, or inserts (collectively referred to herein as "cutters") become dull, and/or when their substrates wear or erode, they are removed from a bit on which they are installed on and are replaced with new cutters. The used cutters are typically thrown away. Applicants have discovered that they can successfully re-process the TSP material from such cutters and believe that after re-processing such TSP material, the re-processed TSP material may even have better properties than originally. For example, in a case where a cutter 10 (FIG. 1) is removed from bit because an edge 12 of a TSP layer 14 of such cutter is dull, the TSP layer 14 may be separated from the cutter by removing the substrate 16 of the cutter, as for example cutting off a large portion of the substrate and by lapping off the remaining portion of the substrate. The TSP layer may then be cut to an appropriate size or shape(s). For example, if the cutter was a 16 mm cutter (i.e., a cutter having a 16 mm diameter), the TSP material layer may be cut, as for example shown in FIG. 2 along dashed line 17, to a 13 mm diameter layer 18 for forming a 13 mm cutter. The cut TSP material is then leached to remove to remove substantially all the infiltrant and/or catalyst from at least a portion of the cut TSP material. Alternatively, the cutter may be cut to remove the dull portion of the TSP material along with its corresponding substrate portion without separating the TSP material from the substrate. The remaining TSP material with attached substrate is then leached to remove to remove substantially all the infiltrant and/or catalyst from at least a portion of the remaining TSP material.

Figure 3:
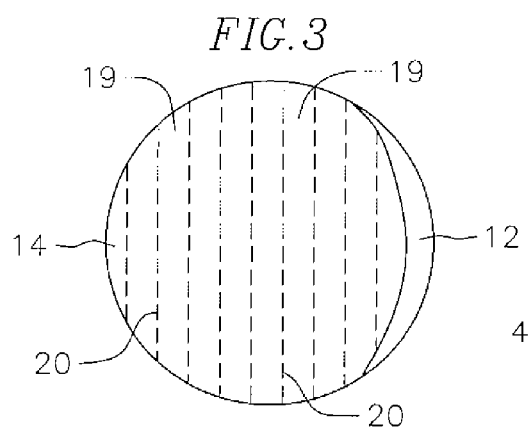

In an exemplary embodiment, the TSP material may be cut into strips 19, by cutting the removed TSP layer as for example shown in FIG. 3 by dashed lines 20. The strips 19 may be used in cutters which incorporate strips of TSP material, as for example the cutters disclosed in U.S. patent application Ser. No. 11/350,620, filed on Feb. 8, 2006, the contents of which are fully incorporated herein by reference. Yet in another exemplary embodiment, the used TSP material layer may be cut into various other shapes, as for example, oval, semi-circular, square, rectangular, triangular, etc., and such shapes can be attached on new substrates to form new cutters such as those described in U.S. patent application Ser. No. 11/350,620, which requires only that sections of a cutter cutting table (i.e., cutting layer) are formed from a TSP material layer, and such as those described in U.S. patent application Ser. No. 12/245,582, filed on Oct. 3, 2008, the contents of which are fully incorporated herein by reference. The cut TSP material layer may be attached to the new substrate using an HTHP bonding process or other methods such as microwave sintering or brazing. The cutting of the TSP material layer may accomplished using known methods, as for example Electro-Discharge Machining (EDM), Electro-Discharge Grinding (EDG) or laser cutting. Prior to attaching, the TSP material layer is leached to remove substantially all of the infiltrant and/or catalyst for at least a portion of such layer so that such portion may be re-infiltrated during the bonding process for re-attaching the TSP material layer to the new substrate.

In other exemplary, embodiments, the used TSP material layer, e.g., the TSP material layer of a used cutter may be re-processed without cutting. For example, in a case when a cutter is not useable due to substrate wear or erosion, the substrate of such cutter may be removed and the TSP material layer of such cutter may be re-used to form new cutters without having to be cut.

Figure 4:
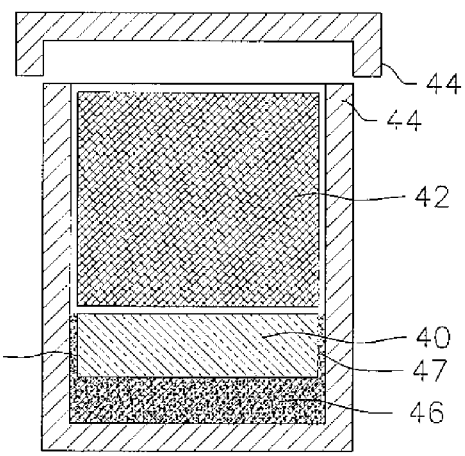
FIG. 4 is a cross-sectional view of a bonding assembly including a can, a TSP material layer, a first substrate material and a second optional substrate material which are to be HTHP bonded to form a cutting element according to an exemplary embodiment of the present invention.
Figure 5:
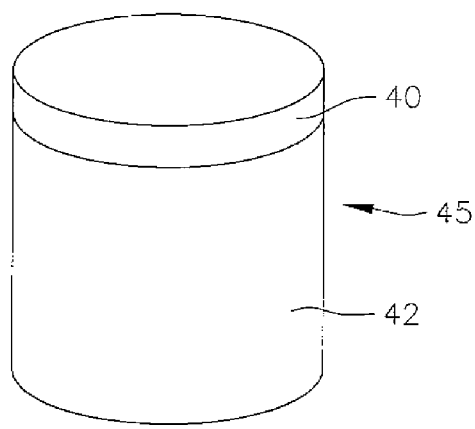
FIG. 5 is a perspective view of an exemplary embodiment TSP material cutting element of the present invention.
Figure 6:
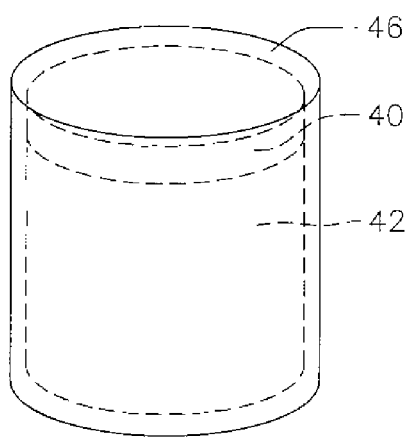
FIG. 6 is a perspective view of an exemplary embodiment TSP material cutting element of the present invention shown prior to machining to remove part of the substrate to expose the TSP material layer.

Once the used TSP material layer is removed from its substrate, in an exemplary embodiment, the removed TSP layer may be re-leached to remove some of the infiltrant, e.g. the cobalt, that may have re-infiltrated the TSP material layer from the substrate when it was originally attached to its substrate by an HTHP bonding process or an infiltrant that may have been added to facilitate the bonding process, as for example a metal or metal alloy infiltrant and/or any catalyst that may have been left over in the layer. Exemplary infiltrants include copper, silver, copper alloys and silver alloys, as well as other metal and metal alloys whose coefficient of thermal expansion is similar to that of diamond, as for example less than three times the coefficient of thermal expansion of diamond. The TSP material layer may be then cut, if necessary to the appropriate shape or shapes. In some exemplary embodiments the TSP material layer is cut to remove a worn portion of the TSP material layer. The cutting of the layer to the appropriate shape may be accomplished even prior to the re-leaching process. For convenience, whether cut or not, the TSP material layer removed from the substrate is referred to as the "reclaimed TSP material layer." In cases where the reclaimed TSP material layer is used to form a cutting table, or part of a cutting table of a cutter, the reclaimed TSP layer may be attached to a new substrate to form a new cutting element or compact with a "re-processed" TSP layer. The attaching may occur using microwave sintering or other known bonding methods, or can be HTHP bonding processed onto a new substrate by placing the reclaimed TSP layer 40 adjacent a tungsten carbide substrate 42 in a refractory metal can 44, as for example shown in FIG. 4, and subjecting the assembly to a HTHP bonding process forming a cutting element 45 having a TSP cutting layer 40 attached to a substrate 42, as for example shown in FIG. 5. The substrate may be a cemented tungsten carbide substrate or may be in powder of green form. In a further exemplary embodiment, a second substrate material 46, such a green tungsten carbide powder may be incorporated to sandwich the reclaimed TSP layer between such substrate material 46 and said substrate 42, as for example shown in FIG. 4. In the shown exemplary embodiment, the tungsten carbide powder, i.e., substrate material 46, flows around the periphery of the reclaimed TSP material layer forming a portion 47 surrounding the reclaimed TSP material layer periphery, as for example shown in FIG. 6. This assembly is then subjected to an HTHP bonding process forming a compact where the reclaimed TSP material layer is completely encapsulated by the substrates 42 and 46, as for example shown in FIG. 6. The substrate 46 and part of the substrate 42 are then removed, as for example by lapping, to form the cutting element 45 with a re-processed TSP material layer 40 as shown in FIG. 5. In another exemplary embodiment, instead of a green powder, the second substrate may be a cemented material, such as cemented tungsten carbide, a pre-cemented tungsten carbide powder, a pre-sintered tungsten carbide powder, or tungsten carbide (WC—Co) powder. Pre-cemented tungsten carbide powder is formed by forming cemented tungsten carbide, as for example a cemented tungsten carbide substrate, and then crushing it to form the powder. Pre-sintered tungsten carbide powder, is powder that has only been partially sintered.

Figure 7A:
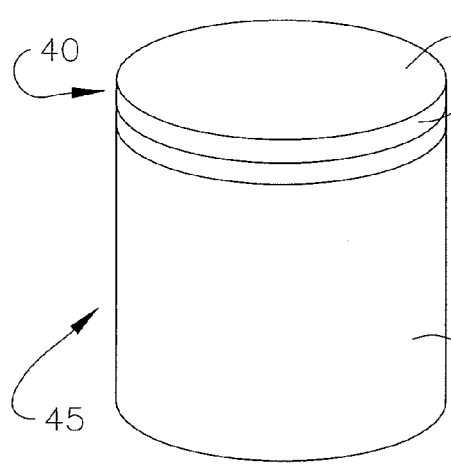
FIGS. 7A and 7B are perspective views of exemplary embodiment TSP material cutting elements with only a portion of their TSP material cutting layers being generally free of an infiltrant.
Figure 7B:
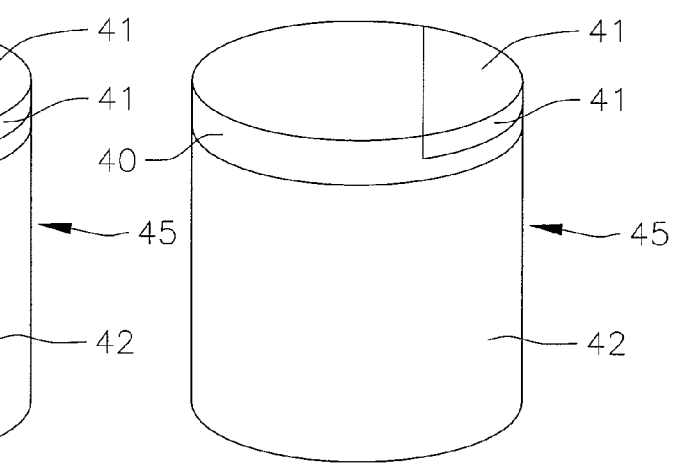

The re-processed TSP material layer may be tailored to have a first region free or substantially free of an infiltrant and a second region having an infiltrant that infiltrated the TSP material layer during the HTHP bonding process. This can be accomplished by leaching to remove the infiltrant from the first region. In an exemplary embodiment a first region 41 extends across the entire upper portion of the re-processed TSP material layer 40 as for example shown in FIG. 7A. In another exemplary embodiment, the first region 41 covers only an upper portion including the edge of the TSP material layer 40 that will be used to cut through the earth formations, as for example shown in FIG. 7B. The depth of the first region may be dependent on the type of earth formations that will be cut. For example, with earth formations that will generate higher frictional heat on the TSP material layer, the first region should be deeper. Thus, the size of the first region of the TSP material may be defined by the type of cutting for which the TSP material layer will be used. In this regard, by limiting the depth and/or size of the first region, the time required to leach the infiltrant is also limited, i.e., reduced. In an exemplary embodiment, when the re-processed TSP material is fully infiltrated during the bonding process, at least a portion of such re-processed TSP material layer is leached to remove at least a substantial portion of the infiltrant accompanying such portion of the re-processed TSP material layer. It should be understood that any portion of a TSP material that is infiltrated with a metal or metal alloy infiltrant, e.g., cobalt, may no longer be a TSP material as it would include the metal or metal alloy infiltrant, e.g. the cobalt. However, for descriptive purposes such portion is described herein as being an TSP material that has been infiltrated or re-infiltrated or a re-processed TSP material or a TSP material that has been infiltrated or re-infiltrated.

Figure 8:
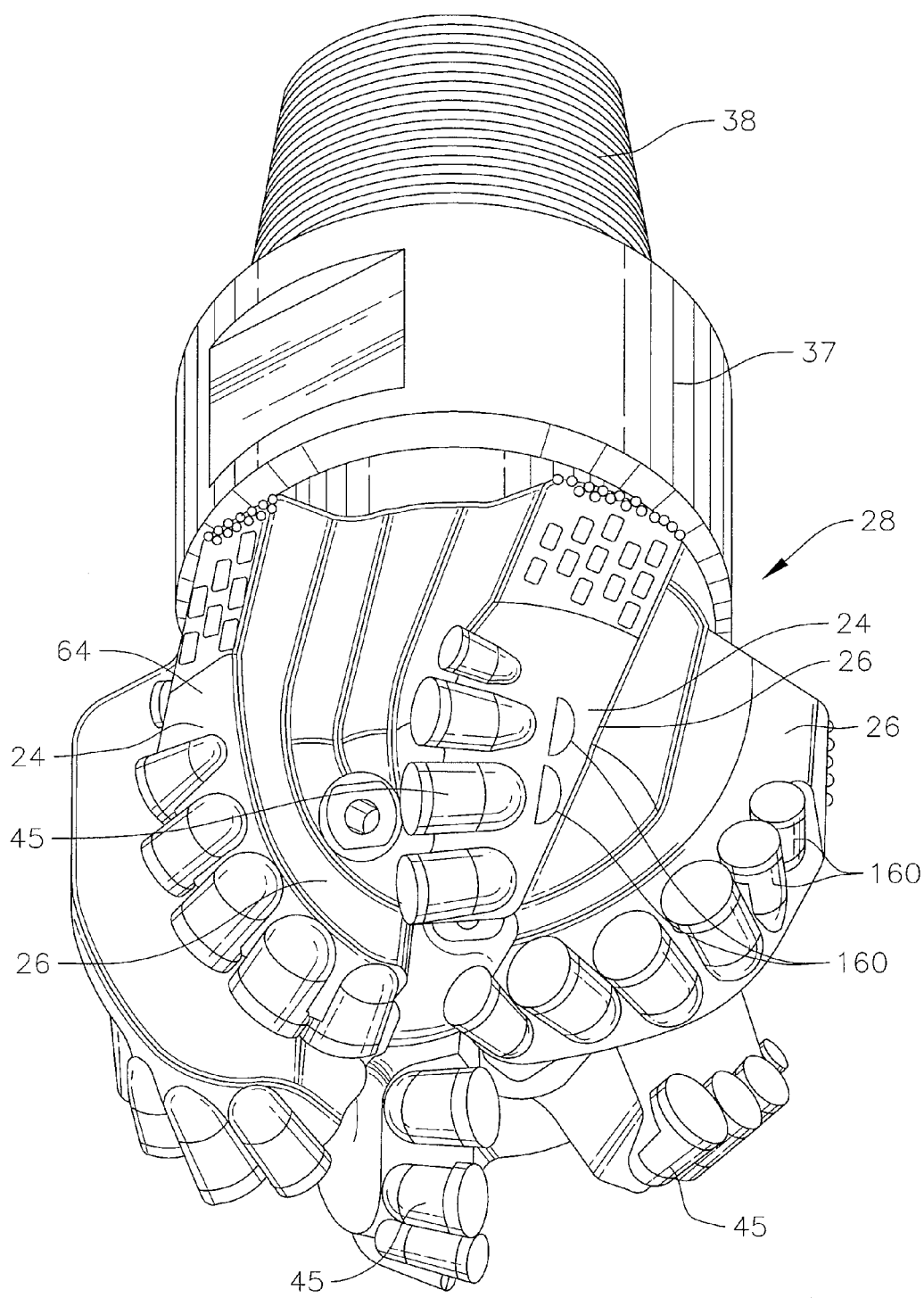
FIG. 8 is a plan view of an exemplary embodiment drag bit having exemplary embodiment cutting elements of the present invention mounted thereon.

In another exemplary embodiment, the reclaimed TSP material layer may be cut into pieces 29 and incorporated into a bit making process where the TSP material layer pieces are mixed with a matrix material which is used to form a portion of the bit body, as for example the outer surface 24, and/or the blades 26 of a drag bit 28 as for example shown in FIG. 8. The reclaimed TSP material are leached, as necessary, prior to or after cutting, if cutting is necessary. Processes for forming bit bodies having outer surfaces incorporating ultra hard material, as for example polycrystalline diamond, ultra hard material particles, are described in U.S. patent application Ser. No. 11/250,097, filed on Oct. 12, 2005, the contents of which are fully incorporated herein by reference.

Figure 9:
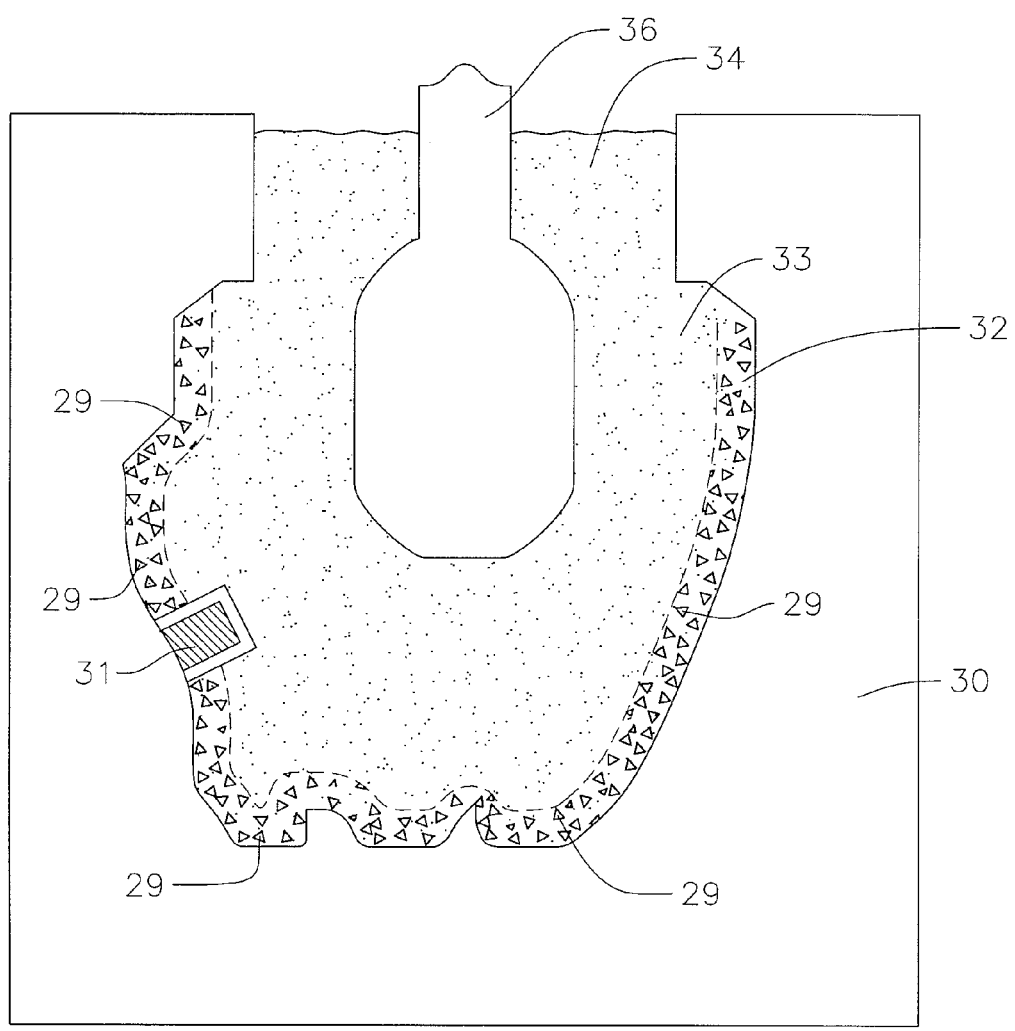
FIG. 9 is a schematically depicted cross-sectional view of a mold packed with matrix material and TSP material pieces for forming the bit body of the bit shown in FIG. 8 in accordance with the present invention.

In an exemplary embodiment, to form a bit body a mold 30 is provided, as for example shown in FIG. 9. The mold is commonly formed of graphite and may be machined into various suitable shapes. Displacements 31, as for example plugs, are typically mounted in the mold to define pockets for accommodating cutting elements such as cutters and for defining cavities to accommodate nozzles and the like. A matrix powder 32 that is used to form the outer surface or a portion of the outer surface of the bit body is placed in the mold. The matrix powder may be a powder of a single matrix material such as tungsten carbide, or it may be a mixture of more than one matrix material such as different forms of tungsten carbide. The matrix powder may include further components such as metal additives. The reclaimed TSP material pieces (the "TSP pieces") 29 are added and mixed with the matrix powder 32 prior to the placing of the matrix powder in the mold. The same or a different matrix powder 33, with or without the TSP pieces is placed in the mold adjacent already placed matrix powder. Metallic binder material 34 is then typically placed over the matrix powder. The components within the mold are then heated in a furnace to the flow or infiltration temperature of the binder material at which the melted binder material infiltrates the tungsten carbide or other matrix material. This heating process is an infiltration process although it is also commonly referred to as sintering or liquid phase sintering. This infiltration process bonds the grains of matrix material to each other and to the other components to form a solid bit body that is relatively homogenous throughout. This infiltration process also causes the matrix material to bond to other structures that it contacts as well, such as a metallic blank 36 which may be suspended within the mold to produce the aforementioned reinforcing member. The formed bit body is then removed from the mold with the TSP pieces being embedded in the outer surface of the bit body. After formation of the bit body, a protruding section of the metallic blank may be welded to a second component 37 called an upper section (FIG. 8). The upper section typically has a tapered portion 38 that is threaded onto a drilling string. In other exemplary embodiments, the TSP pieces maybe embedded in other portions of the bit body.

Figure 10:
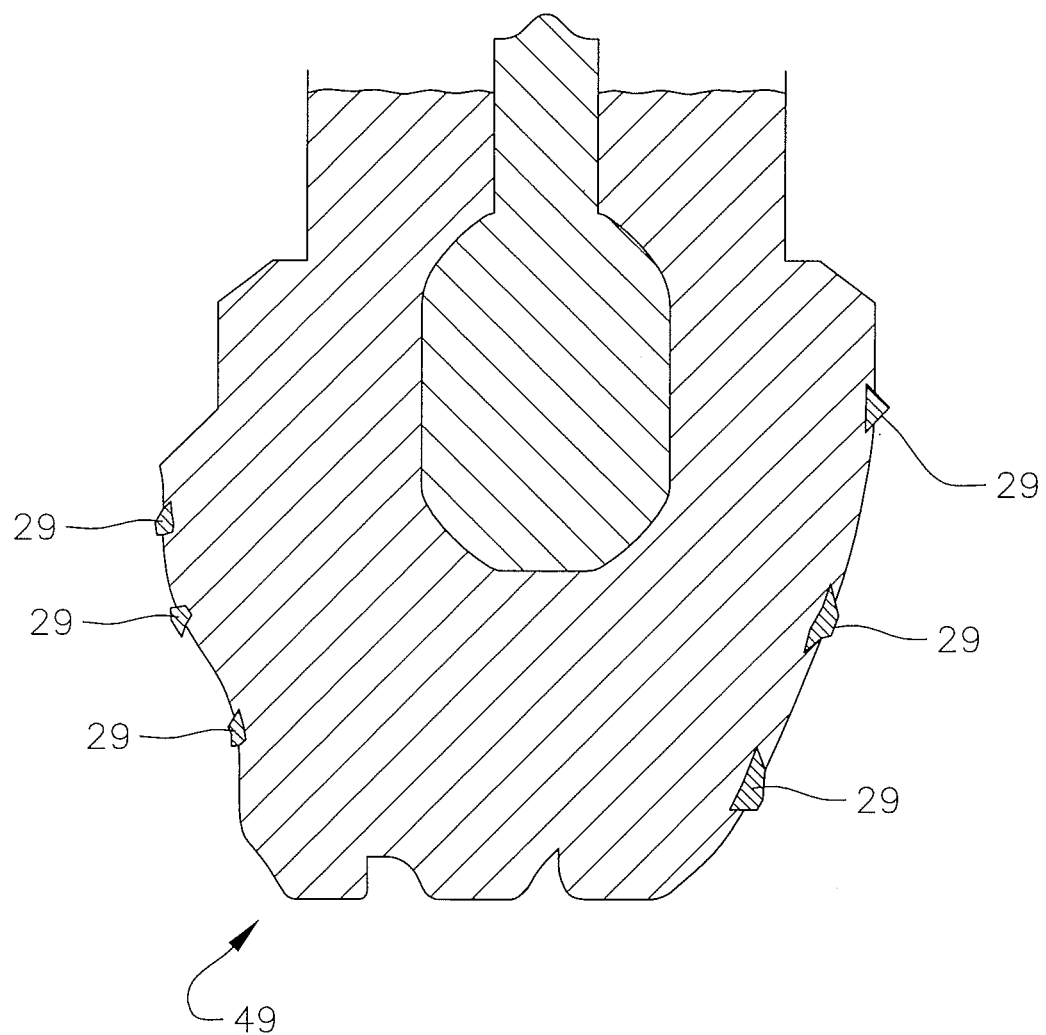
FIG. 10 is a schematically depicted cross-section view of an exemplary embodiment bit body of the present invention.

In one exemplary embodiment, the TSP pieces 29 may be positioned in the mold to form cutting elements 29 protruding from the outer surface of the bit body 49, as for example shown in FIG. 10. With such an exemplary embodiment, the TSP pieces are cut to have sufficient size for forming such cutting elements. The bit body 49 in one exemplary embodiment, may be a bit body for a drag bit 28 as for example shown in FIG. 8 or may be a diamond impregnated bit, a roller cone bit or any other type of bit. These are well known bits in the art. Exemplary bits are disclosed in U.S. Patent Publication No. 2006/0032677, published on Feb. 16, 2006, the contents of which are fully incorporated herein by reference.

Figure 11:
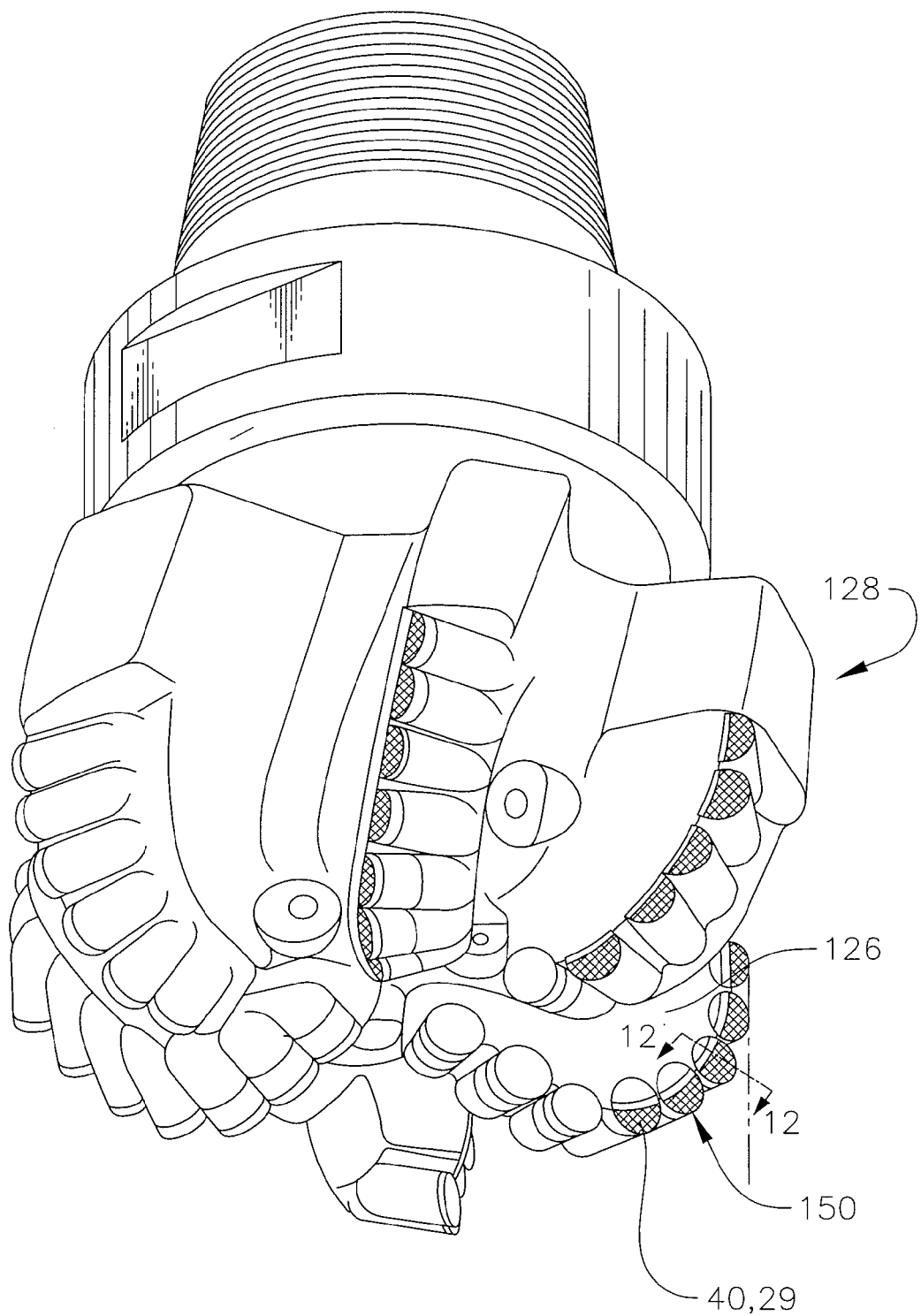
FIG. 11 is perspective view of yet another exemplary embodiment drag bit of the present invention.
Figure 12:
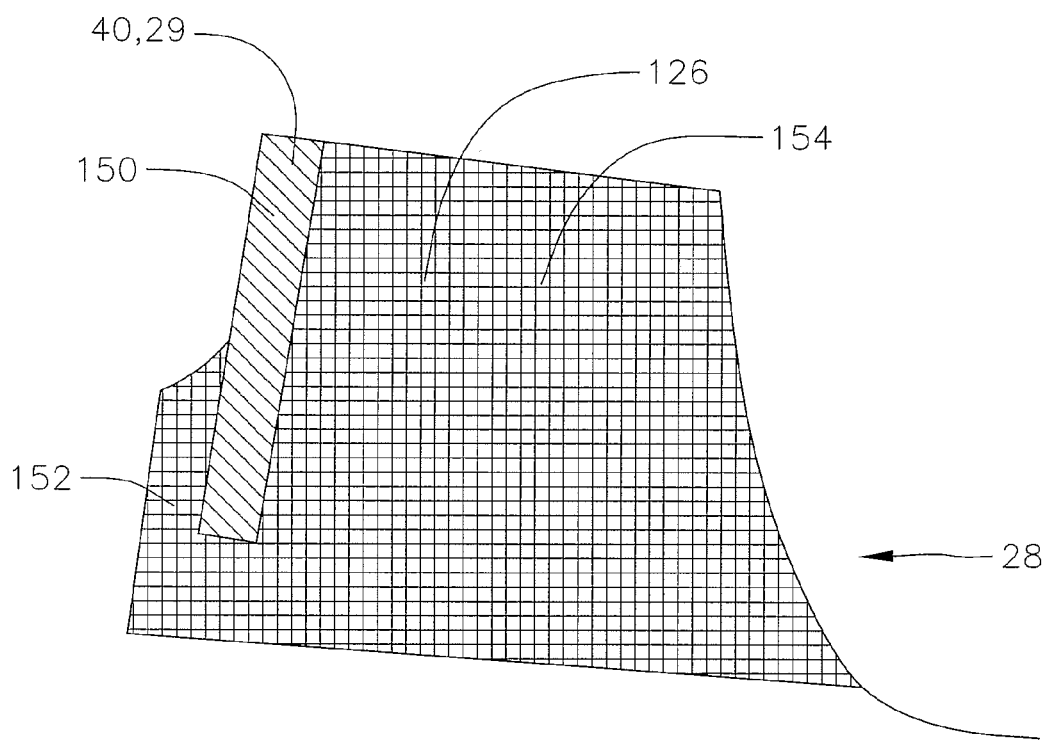
FIG. 12 is a cross-sectional view of an exemplary embodiment cutting element mounted on the bit body shown in FIG. 11 and taken along arrows 12-12 through the bit body shown in FIG. 11.
Figure 13A:
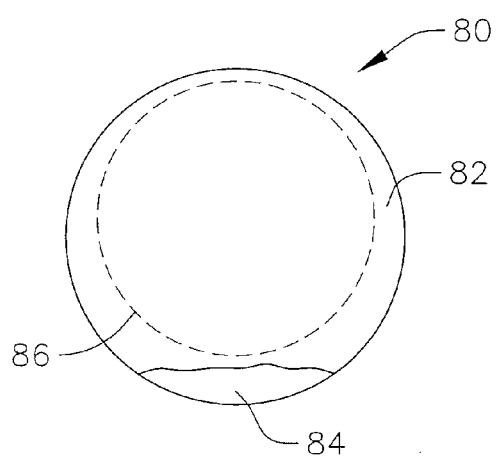
Figure 13B:
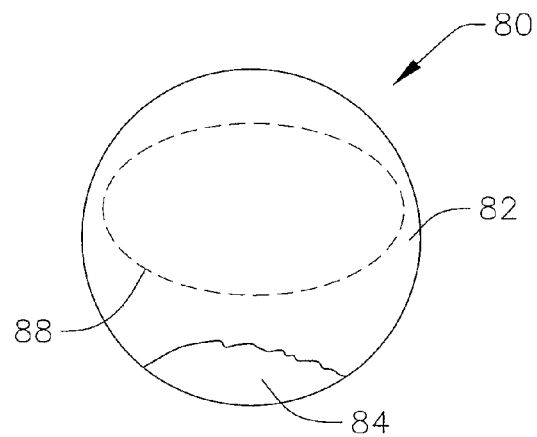
Figure 13C:
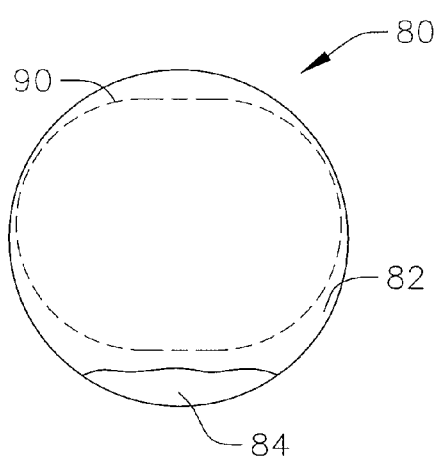
Figure 13D:
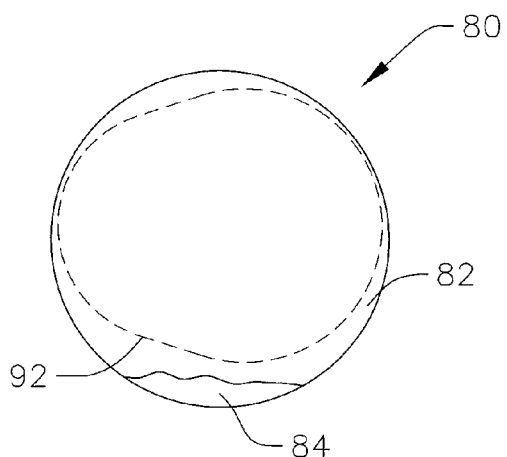

In other exemplary embodiment, reclaimed TSP material layers and/or TSP pieces may be positioned in a mold so as to form bit body cutting elements or may be bonded to the bit body after the bit body is formed to form bit body cutting elements. For example the reclaimed TSP may be shaped, as necessary, and attached to the leading edges of the blades, e.g. blades 126, of the bit body 128 to form shear cutting elements, as for example shown in FIGS. 11 and 12. The reclaimed TSP material layers 40 or TSP pieces (29) may be bonded with out the use of a substrate, for example by using metals, or other known methods, to a leading edge 126 of a bit body 128 or may be positioned in the mold used for forming the bit body such that they are attached by infiltration by an infiltrant (e.g., cobalt and/or other metallic binder material used) to the bit body when it is formed. In this regard the TSP material layers and/or TSP pieces form shearing cutting elements 150 attached to the bit body 128. In an exemplary embodiment, a shearing cutting element 150 may be sandwiched between a lip portion 152 and a backing portion 154 which is part of the blade 126, as for example shown in FIG. 12. These reclaimed TSP material layers and/or pieces, may be re-leached as necessary to remove any infiltrant and/or any left over catalyst from at least a portion of the TSP layers or TSP pieces.

In other exemplary embodiments, reclaimed TSP material layers 40 and/or TSP pieces 29 may be embedded in the bit body by being attached to the bit body using known methods or by positioning such layers and/or pieces within the mold forming the bit body such that these layer or pieces are attached to the bit body when the bit body is formed to form cutting elements, such as secondary cutting elements 160 positioned behind the cutting elements 45, as for example shown in FIG. 8. As can been seen, these reclaimed TSP material layers and TSP pieces may be attached to the bit body without first being attached to a substrate.

In another exemplary embodiment, a used cutting element 80 which includes a TSP material layer 82 having a worn portion 84 and/or a worn or eroded substrate may be ground, cut and/or lapped (individually or collectively referred to as "cut") to remove a worn portion of the TSP material layer along with its corresponding substrate and then reused (FIGS. 13A to 13G). For example, in one exemplary embodiment, a larger diameter cutting element, as for example a 16 mm diameter shear cutter type cutting element, i.e., a cutting element having 16 mm diameter having a worn TSP material layer portion may be ground, cut and/or lapped to a smaller diameter shear cutter type cutting element 86 (shown in dashed lines on FIG. 13A), as for example a 13 mm shear cutter type cutting element, by cutting the new diameter cutting element at a location not including the worn portion 84 and removing the worn portion of the TSP material layer along with its corresponding substrate portion. The TSP material layer may be re-leached as necessary after cutting to remove any infiltrant and/or any left over catalyst.

In other exemplary embodiments, instead of a circular cutting element, other shapes such as an elliptical shape 88 (FIG. 13B), an oblong shape 90 having parallel sides (FIG. 13C) or an oblong shape 92 (FIG. 13D) having non-parallel sides, or a triangular shape 94 (FIG. 13E), or a semi-circular shape 96 (FIG. 13F), or a tombstone shape 98 (FIG. 13G), or multiple shapes 100 and 102 (FIG. 13H) may be cut from the used cutting element to remove the worn portion 84 of the TSP material layer 82 along with its corresponding substrate to form a reclaimed cutting element having such shape. These shapes have been provided by way of example, other shapes may also be cut. Once the worn portion of the TSP material layer is removed, the newly defined TSP material layer will have a newly exposed peripheral surface 89, as for example shown in FIG. 13I. Such peripheral surface may still contain a catalyst and/or an infiltrant. Consequently, such surface may also have to be leached to remove at least a substantial portion of the catalyst and/or infiltrant from such peripheral surface. It is preferable that all surfaces of the TSP material layer that make contact with the earthen formations during cutting are substantially free of catalysts and/or infiltrants. In such case, the newly exposed peripheral surface 89 will have to be leached if the TSP material layer was not leached through its entire thickness prior to be being cut to remove the worn portion. For example, as shown in FIG. 13J, section 83 of TSP material layer 82 was originally leached such that TSP material layer 82 had a leached portion 83 substantially free of a catalyst and/or an infiltrant and a non-leached portion 85. After the TSP material layer is cut along line 87 to remove worn portion 84, the new peripheral surface (or peripheral surface section) 89 exposed has a portion 91 which has not been leached. Thus, the newly peripheral surface section 89 or at least its portion 91 will have to be leached in order to ensure that the entire new peripheral surface section 89 is substantially free of a catalyst and/or an infiltrant.

The TSP material layer may be re-leached, if necessary, to form a defined region on the cut TSP material layer that is free of catalysts and/or infiltrants. The re-leaching may occur prior to, or after cutting. Removal of the catalyst infiltrant creates voids within the TSP material layer in the space previously occupied by the infiltrant. The reclaimed cutting element may then be attached to a bit body using known methods.

In other exemplary embodiments, TSP material cutter having a worn or eroded substrate portion and not necessarily a worn TSP material portion may be cut in any shape to remove the worn or eroded substrate portion along with its corresponding TSP material layer portion to foam a new reclaimed cutting element. In a further exemplary embodiment, a cutting element incorporating a TSP layer, which cutting element has not been used but which is defective, may be cut to a new desired shape or a smaller similar or identical shape discarding the defective TSP layer portion and/or substrate to form a reclaimed new cutting element and re-leached, if necessary, as described above in relation to FIGS. 13A to 13H. Such reclaimed cutting element may be used as a bearing, as for example an insert for a thrust bearing ring, as for example described in U.S. Pat. No. 4,560,014, the contents of which are fully incorporated herein by reference.

Figure 14:
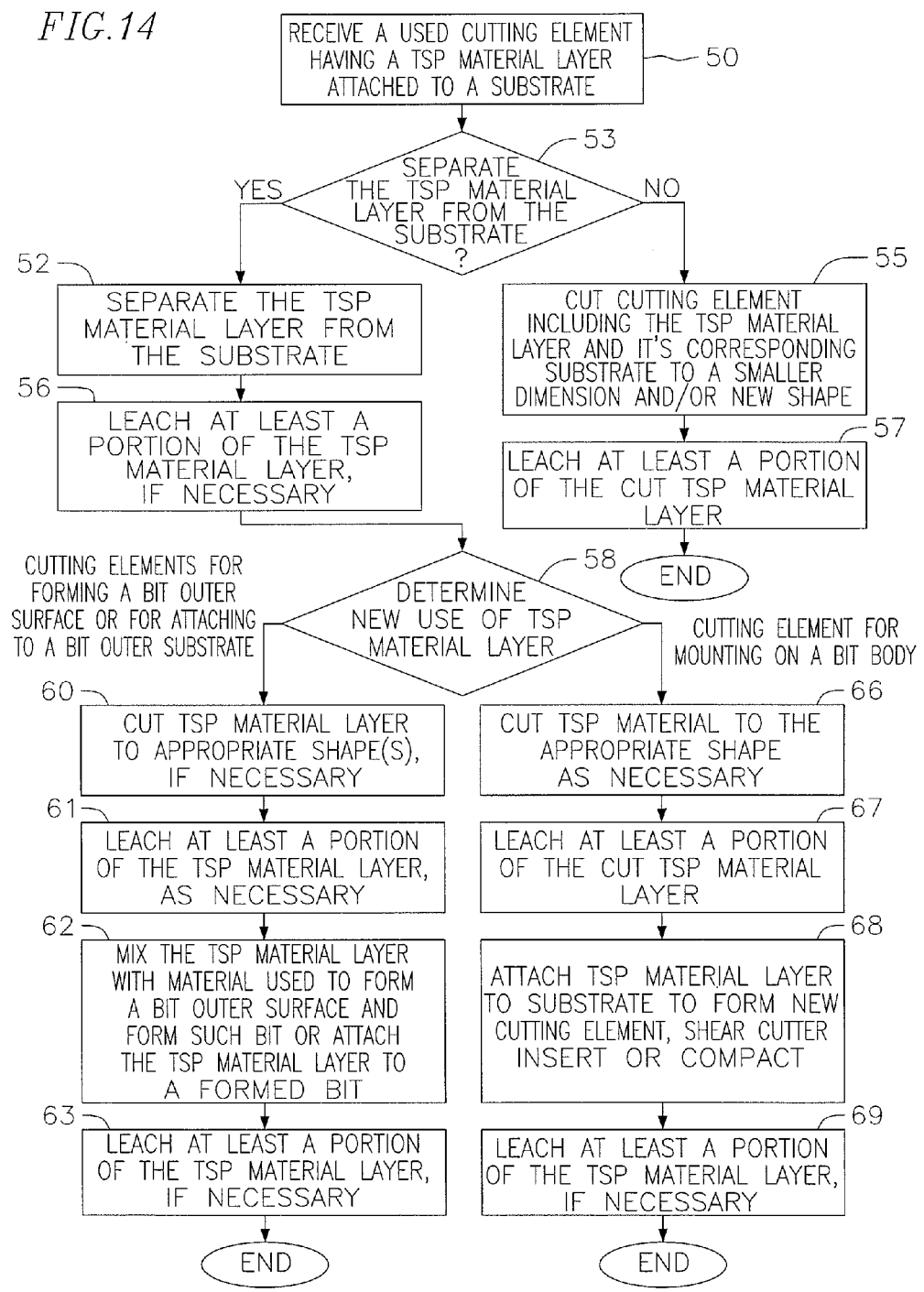
FIG. 14 is flow chart of an exemplary process of the present invention used to re-process TSP material.

An exemplary process is shown in the algorithm depicted in FIG. 14. First a used TSP cutting element having a TSP material layer attached to a substrate is received from the field as depicted in field 50. A decision is made on whether to remove the substrate from the TSP material layer (field 53) by grinding, cutting and/or lapping. If the substrate is not removed, the cutting element is ground, cut and/or lapped to a smaller dimension and/or different shape so as to remove any worn portion and to form a new cutting element (field 55). The TSP material layer is then leached again for forming at least region at least substantially free of infiltrant and/or a catalyst, as for example depicted in field 57. If the TSP material layer is separated from the substrate the reclaimed TSP material layer may be leached, as depicted in field 56. The new use of the reclaimed TSP material layer is then determined, as depicted in field 58. It should be understood, that the decision on the new use of the TSP material layer can be made at any point in the process, even before the TSP cutting element is received, i.e., even before field 50. If the new use is to form cutting elements for embedding in a surface of bit, or for attaching to a bit, then the reclaimed TSP material layer may be cut, if necessary, to the appropriate shapes having the appropriates sizes, as for example depicted in field 60. The piece(s) cut or otherwise are then leached as necessary to remove any infiltrant and/or a catalyst from at least a portion of the piece(s) (field 61) especially if leaching did not occur in field 56. The piece(s) are then mixed with a matrix material used to form the bit outer surface, or are attached to a formed bit, as for example depicted in field 62. The piece(s) may be leached, if necessary (field 63). If a decision is made to use the reclaimed TSP material layer to form a cutting layer to be bonded to a substrate to form a cutting element, such as a shear cutter for mounting a drag bit body, or to form an insert for mounting on bit body, such as a roller cone bit or a percussion bit, or for mounting on a thrust bearing, or a compact, the reclaimed TSP layers is cut to the appropriate size, if necessary, as for example depicted in field 66. The cut TSP material layer is leached (field 67) to remove any infiltrant and/or a catalyst, especially if it was not leached in field 56. The reclaimed TSP layer is then attached to a new substrate, as for example a tungsten carbide substrate, by brazing, microwave sintering, HTHP bonding processing or other known methods, as for example depicted in field 68. The attached TSP material layer is then leached again, if necessary, for forming at least region at least substantially free of infiltrant.

In other exemplary embodiments, the present invention re-processes TSP material layers which have been attached on substrates to form a compacts or cutting elements which are defective, even though such compacts or cutting elements have not been used to cut. With this exemplary embodiments, the TSP material layers are re-processed as described above. In other exemplary embodiments, a TSP material layer that is being re-processed is a TSP material layer that in not attached to a substrate but which has been used for cutting. Such TSP material layer is cut, if necessary, and re-processed as described herein.

Applicants believe that the properties of the re-processed TSP layers improve by being subjected to the additional HTHP bonding process for bonding the used TSP layer to the substrate. Applicant's also believe that in the embodiments, where a re-processed TSP layer is HTHP bonding processed adjacent to green tungsten carbide powder 46, as for example described with relation to FIG. 4, the re-processed TSP material layer will have better resistance to any micro-cracking in such re-processed TSP layer.

Although the present invention has been described and illustrated in respect to various exemplary embodiments, it is to be understood that it is not to be so limited, since changes and modifications may be made therein which are within the full intended scope of the this invention as hereinafter claimed. For example, the reclaimed TSP material layers described herein may be used in all applications where PCD or TSP material is currently being used in lieu of such PCD or TSP material and may be shaped in any shape necessary by grounding, cutting and/or lapping. In addition, the TSP material may be reclaimed from bits, as for example from bits where the TSP material layer is embedded in such bit body or is otherwise attached to such bit body with or without a substrate. In addition, with any of the aforementioned embodiment, the TSP material that is being reclaimed may be TSP material that has already been reclaimed at least once before. Moreover, any reclaimed TSP material may be leached at any point to remove any infiltrant and/or residual catalyst from at least a portion of the material. Furthermore, the infiltrants identified herein for infiltrating the TSP material have been identified by way of example. Other infiltrants may also be used to infiltrate the TSP material and include metals and metal alloys such as Group VIII and Group IB metals and metal alloys. It should be also noted that when a ceramic material or an oxide is used as an infiltrant, such materials cannot be typically leached using a leaching acid. Moreover, it should be understood that the TSP material that is being re-claimed may have been attached to other carbide substrates besides tungsten carbide substrates, such as substrates made of carbides of W, Ti, Mo, Nb, V, Hf, Ta, and Cr and/or may be re-processed and attached to other substrates such as substrates made of carbides of W, Ti, Mo, Nb, V, Hf, Ta, and Cr. Moreover, leaching has been used herein by way of example for removing an infiltrant and/or a catalyst. Other methods that can serve the same purpose may also be used.

What is claimed is:

1. A method of forming a cutting element comprising:
receiving a used cutting element comprising a substrate and a thermally stable polycrystalline diamond (TSP) material layer attached to said substrate, wherein said TSP material layer is a polycrystalline diamond layer with at least a substantial portion of a catalyst in at least a portion of said polycrystalline diamond layer having been removed, wherein a portion of at least one of said TSP material layer and said substrate is worn;
removing a section of said TSP material layer and a corresponding section of said substrate including said worn portion to form a new cutting element having at least one of a new dimension and a new shape, wherein removing said section exposes a new surface of said TSP material; and
removing at least one of a catalyst and an infiltrant from at least a portion of said new surface.

2. The method as recited in claim 1 further comprising leaching said TSP material layer prior to, or after said removing a section, for removing substantially all of at least one of a catalyst and an infiltrant from at least a portion of said TSP material layer other than said new surface.

3. The method as recited in claim 1 further comprising attaching said new cutting element to a bit body.

4. The method as recited in claim 1 wherein said new cutting element is an insert, the method further comprising using said insert or as a bearing insert on a thrust bearing.

5. A method of making a cutting element comprising:
removing a thermally stable polycrystalline diamond (TSP) material cutting element from a bit, said TSP material cutting element comprising a TSP material layer bonded to a substrate, wherein said TSP material layer is a polycrystalline diamond layer wherein at least a portion of a catalyst in at least a portion of such layer had been removed;
separating said TSP material layer from the substrate;
removing substantially all of at least one of a catalyst and an infiltrant from at least a portion of said TSP material layer; and
attaching said TSP material layer onto a new substrate forming a new cutting element, wherein during attaching said TSP material layer is at least partially infiltrated with an infiltrant becoming an infiltrated TSP material layer.

6. The method as recited in claim 5 further comprising removing substantially all of said infiltrant from at least a portion of said infiltrated TSP material layer.

7. The method as recited in claim 5 further comprising removing substantially all of said infiltrant from at least a portion of said infiltrated TSP material layer only if said infiltrated TSP material layer is fully infiltrated.

8. The method as recited in claim 5 wherein removing comprises leaching said infiltrated TSP material layer to remove substantially all of at least one of the catalyst and said infiltrant from at least said portion of said infiltrated TSP material layer.

9. The method as recited in claim 5 wherein at least substantially all of the catalyst has been removed from said entire TSP material layer prior to attaching.

10. The method as recited in claim 5 wherein the infiltrant is a metal or metal alloy infiltrant.

11. The method as recited in claim 5 wherein attaching comprises subjecting said TSP material layer and said new substrate to a high temperature high pressure (HTHP) bonding process using said infiltrant.

12. The method as recited in claim 5 further comprising cutting said TSP material layer leaving a cut TSP material layer portion, and wherein attaching comprises attaching said cut TSP material layer portion.

13. The method as recited in claim 5 wherein said new substrate is placed adjacent a side of said TSP material layer, and wherein another substrate is placed adjacent an opposite side of said TSP material layer, whereby said TSP material layer is sandwiched between said new substrate and said another substrate, and wherein the TSP material layer and both substrates are subjected to a HTHP bonding process.

14. The method as recited in claim 13 wherein said another substrate is a green powder comprising tungsten carbide.

15. The method as recited in claim 13 wherein said new substrate and said powder together completely encapsulate said TSP material layer.

16. The method as recited in claim 5 wherein said attaching is selected from the attaching methods consisting essentially of brazing and microwave sintering.

17. The method as recited in claim 5 further comprising infiltrating at least a portion of said TSP material layer with an infiltrant having a coefficient of thermal expansion similar to the coefficient of thermal expansion of diamond.

18. The method as recited in claim 5 further comprising cutting said TSP material layer leaving a cut TSP material layer portion.

19. The method as recited in claim 5 further comprising:
prior to removing, HTHP sintering a diamond material onto a first substrate forming a polycrystalline diamond ultra hard material layer including a catalyst, bonded onto said first substrate forming said cutting element;
separating said polycrystalline diamond ultra hard material layer from said first substrate; and
removing at least a substantial portion of the catalyst from at least a portion of said polycrystalline ultra hard material layer forming said TSP material layer.

20. The method as recited in claim 19 wherein removing at least a substantial portion of the catalyst occurs prior to separating said polycrystalline diamond layer from said first substrate.

21. A method of forming a bit body comprising:
receiving a used thermally stable polycrystalline diamond (TSP) material layer said TSP material layer having been used to cut an object;
cutting said used TSP material layer into a plurality of TSP material layer pieces;
providing a mold;
providing a matrix powder;
mixing said matrix powder with at least one of said TSP material layer pieces;
placing said mixed powder with said at least one of said TSP material layer pieces in said mold;
providing a binder material within said mold; and
heating said mold to infiltrate said mixed powder and said TSP material layer pieces with said binder to form a bit body comprising a portion including said at least one of said TSP material layer pieces.

22. The method as recited in claim 21 further comprising leaching said TSP material layer to remove at least one of a portion of a catalyst and a portion of an infiltrant.

23. The method as recited in claim 21 wherein at least a substantially portion of the catalyst has been removed from the TSP material layer pieces.

24. The method as recited in claim 21 wherein said cutting comprises removing a worn portion from said TSP material layer.

25. The method as recited in claim 21 wherein receiving comprises receiving a used cutting element comprising a substrate bonded to said used TSP material layer, and wherein the method further comprises removing said substrate from said TSP material layer.

26. The method as recited in claim 25 further comprising removing said used cutting element from a bit body.

27. The method as recited in claim 25 wherein receiving comprises receiving a used bit body having said TSP material layer attached to said bit body, and wherein the method further comprises separating said TSP material layer from said bit body.

28. A method for forming a cutting element comprising:
receiving a used thermally stable polycrystalline diamond (TSP) material layer, said TSP material layer having been used to cut an object, said TSP material layer being a polycrystalline diamond layer with at least a substantial portion of a catalyst in at least a portion of said layer having been removed;
attaching said TSP material layer on a substrate; and
infiltrating said TSP material layer with an infiltrant.

29. The method as recited in claim 28 further comprising removing at least a substantial portion of said infiltrant from at least a portion of said infiltrated TSP material layer.

30. The method as recited in claim 28 wherein said infiltrating occurs during attaching.

31. The method as recited in claim 28 wherein said infiltrant is a material having a coefficient of thermal expansion similar to the coefficient of thermal expansion of diamond.

32. The method as recited in claim 28 further comprising cutting said TSP material layer prior to attaching.

* * * * *

UNITED STATES PATENT AND TRADEMARK OFFICE
CERTIFICATE OF CORRECTION

| | | |
|---|---|---|
| PATENT NO. | : 8,590,130 B2 | |
| APPLICATION NO. | : 12/775402 | |
| DATED | : November 26, 2013 | |
| INVENTOR(S) | : Youhe Zhang et al. | |

It is certified that error appears in the above-identified patent and that said Letters Patent is hereby corrected as shown below:

In the Claims

Column 16, Claim 23, line 9     Delete "substantially"
                                Insert -- substantial --

Signed and Sealed this
Seventeenth Day of February, 2015

Michelle K. Lee
*Deputy Director of the United States Patent and Trademark Office*